United States Patent [19]

Whitten

[11] Patent Number: 4,472,628

[45] Date of Patent: Sep. 18, 1984

[54] FIBER OPTICS TRANSDUCERS FOR SENSING PARAMETER MAGNITUDE

[75] Inventor: James R. Whitten, Scotia, N.Y.

[73] Assignee: General Electric Company, Schenectady, N.Y.

[21] Appl. No.: 530,328

[22] Filed: Sep. 8, 1983

Related U.S. Application Data

[62] Division of Ser. No. 278,266, Jun. 29, 1981.

[51] Int. Cl.³ .............................................. G02B 5/14
[52] U.S. Cl. .................................. 250/227; 250/231 R
[58] Field of Search ........................... 250/227, 231 R; 350/96.15, 96.17, 96.29; 455/610, 612

[56] References Cited

U.S. PATENT DOCUMENTS

| | | | |
|---|---|---|---|
| 4,019,051 | 4/1977 | Miller | 250/227 |
| 4,071,753 | 1/1978 | Fulenwider et al. | 250/227 |
| 4,275,295 | 6/1981 | Menningen et al. | 250/227 |
| 4,294,513 | 10/1981 | Nelson et al. | 350/96.29 |
| 4,342,907 | 8/1982 | Macedo et al. | 250/227 |
| 4,358,678 | 11/1982 | Lawrence | 250/227 |

*Primary Examiner*—David C. Nelms
*Attorney, Agent, or Firm*—Geoffrey H. Krauss; James C. Davis, Jr.; Marvin Snyder

[57] ABSTRACT

A transducer for sensing the magnitude of a parameter, such as mechanical displacement/motion, pressure, temperature, electrical voltage, current and the like, uses a multimode optical waveguide fiber. At least one portion of the fiber is subjected to bending in an amount changing with a change in the sensed parameter magnitude. The resulting microbending losses in the fiber vary the attenuation of light energy between an optical source and an optical detector, response to variations in the sensed parameter magnitude. The variations of the detector output may be monotonically continuous, or may be processed to assume one of a pair of levels for "on-off" switching purposes.

6 Claims, 4 Drawing Figures

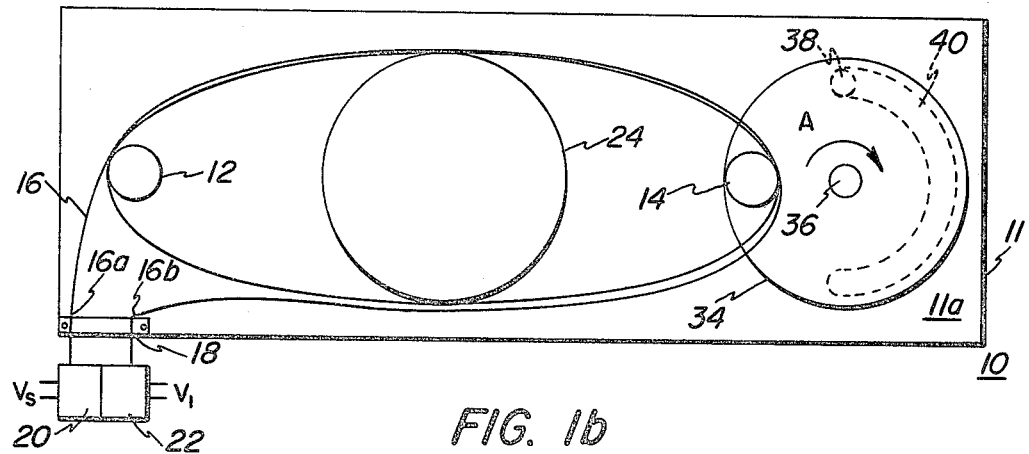
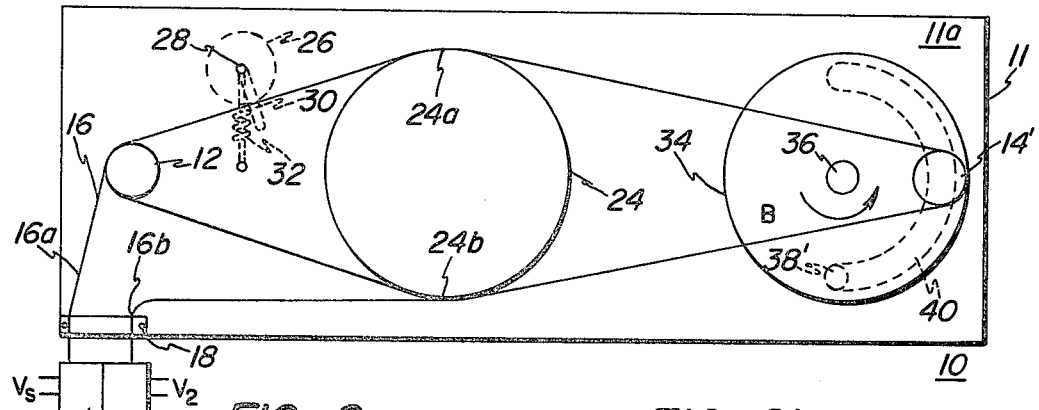

FIBER OPTICS TRANSDUCERS FOR SENSING PARAMETER MAGNITUDE

This application is a division of application Ser. No. 278,266, filed June 29, 1981.

BACKGROUND OF THE INVENTION

The present invention relates to parameter sensing transducers and, more particular, to a novel sensed parameter transducer utilizing changes in microbending loss in multimode optical waveguide fibers responsive to changes in the magnitude of the sensed parameter.

Modern technology often requires that the magnitude of a parameter be sensed by a transducer which is electrically isolated both from subsequent equipment processing the sensor output and also from surrounding noise and signal voltages. Advantageously, optical waveguide fibers can be utilized to supply the required degree of isolation, by virtue of the electrical inertness of the optical fibers. It is therefore highly desirable that transducers for converting magnitudes of a sensed parameter (such as mechanical displacement, temperature, pressure, voltage, current and the like) be provided utilizing optical waveguide fibers. Such fiber optics transducers will, desirably, also be of relatively low cost and be capable of relatively rapid manufacture.

BRIEF SUMMARY OF THE INVENTION

In accordance with the invention, a transducer for sensing the magnitude of a parameter, such as mechanical displacement/motion, pressure, temperature, voltage, current and the like, utilizes at least one portion of a multimode optical waveguide fiber have at least one bend created therein to attenuate light, from a source to a detector, by an amount dependent upon the sensed parameter magnitude. The amount of bending in the at least one bent fiber section creates microbending losses, serving to attenuate the transmitted light in the fiber. The magnitude of the detected signal therefore changes with a change in the magnitude of the sensed parameter.

In one presently preferred embodiment, at least one loop of fiber is placed between a fixed member and a mechanically displacable member, with the radius of bending around at least one of the fixed and/or movable members selected such that complete microbending attenuation of the light in the cable can be provided for sufficiently large mechanical displacement. For displacements less than that displacement resulting in complete attenuation, increased microbending loss in the fiber occurs as the fiber is bent to increasingly smaller radii, as the distance between the movable and fixed members increases.

In another presently preferred embodiment, the magnitude of pressure, temperature, voltage, current and the like parameters is measured by introducing at least one portion of multimode optical waveguide fiber between complementary corrugated members, each so formed as to undergo elongation and effect a change in spacing distance between the members with a change in sensed parameter magnitude. As the corrugated member spacing distance decreases, the at least one optical fiber portion therebetween is increasingly bent, whereby the increased magnitude of microbending loss increases the attenuation of light transmitted through the fiber from a transmitter to a detector.

Accordingly, it is an object of the present invention to provide novel transducers utilizing optical fibers for sensing the magnitude of a selected parameter.

This and other objects of the present invention will become apparent upon consideration of the following detailed description, when read in conjunction with the drawings.

BRIEF SUMMARY OF THE DRAWINGS

FIGS. 1a and 1b are plane views of a mechanical displacement transducers, utilizing, in accordance with the invention, microbending loss in an optical fiber, and respectively in the minimum attenuation/displacement and maximum attenuation/displacement conditions, and including a schematic block diagram of electronic means for providing the transmitter and detector functions;

FIGS. 2a and 2b are sectional sideviews of a temperature, pressure, voltage, current and the like sensed parameter transducer utilizing optical fiber microbending for sensing the magnitude of the selected parameter, and also including a schematic block diagram of electronic means useful for performing transmitter, detector and threshold functions which may be associated therewith.

DETAILED DESCRIPTION OF THE INVENTION

Referring initially to FIGS. 1a and 1b, a fiber optics transducer 10 for sensing the magnitude of mechanical displacement, includes a base member 11, having a surface 11a upon which is mounted a fixed support member 12. A second support member 14 is movably mounted upon another portion of support member surface 11a. A multimode optical waveguide fiber 16 is looped at least once about the exterior peripheries of fixed support member 12 and movable support member 14; the loop ends 16a and 16b of the fiber are mechanical secured to the support member, as by securing means 18 and the like. Optical transmitter, or source, means 20, such as a light-emitting diode (LED) or laser diode and the like, is optically coupled to a first fiber end 16a. Optical source means 20 introduces optical energy at a known intensity into fiber end 16a responsive to the presence of an actuating potential $V_s$. The opposite optical fiber end 16b is coupled to an optical detector means 22, such as a photodiode and the like, and provides an output voltage $V_1$, responsive to the magnitude of the optical energy received at fiber end 16b from source 20. The detector means output $V_1$ magnitude may thus be established to be substantially proportional to the known output of source means 20 and the attenuation per length of optical fiber 16. A maximum magnitude $V_1$ of output potential is established in the minimum attenuation condition, with the fiber being substantially loosely looped about support members 12 and 14 (FIG. 1a).

The at least one loop of optical fiber 16 is so adjusted such that, when movable member 14 is mechanical displaced, portions of the loop are bent about the surface periphery of at least one of members 12 and 14. The bending of the optical waveguide fiber about a member periphery, as member 14 is mechanically displaced by increasing amounts toward its maximum displacement position 14' (FIG. 1b) causes the bending radius of the bent portion(s) of fiber loop(s) to steadily decrease and induces an increasing magnitude of microbending loss in the optical waveguide fiber, thereby increasing the optical attenuation therein. Accordingly, detector means 22 receives decreasing amounts of the optical energy output from source means 20, and the detector means output voltage decreases, to some minimum value $V_2$, less than the initial detector means output magnitude $V_1$. The relationship between the detector means output voltage and the mechanical displacement of movable member 14 may be empirically established, and may be varied by varying the number of turns of the optical waveguide fiber looped about members 12 and 14, by decreasing the diameter (and therefore the bending radius) of one or both of members 12 and 14, and the like. A certain minimum diameter of members 12 and 14 will be required, dependent upon the particular optical waveguide fiber used, such that the fiber bending radius does not decrease to a dimension which will result in breakage of the fiber at the position of maximum mechanical translation of member 14'.

In one presently preferred embodiment, a second fixed member 24, of considerably greater diameter than either of members 12 and 14, is fastened to support member surface 11a between members 12 and 14. Second support member 24 serves to not only further support the loops of optical fibers 16 and prevent twisting thereof (in the loosely-coiled minimum mechanical translation condition of FIG. 1a) but also serves to establish additional bending surfaces, at those portions 24a and 24b at which the fibers contact the second support member (in the mechanically translated condition of FIG. 1b). The additional attenuation introduced into the fiber loop by second support member portions 24a and 24b may be established, by coordination of the relationship of diameters and positions of members 12, 14 and 24. Particularly, the loop length may be so coordinated with the three member diameters such that the additional microbending losses due to portions 24a and 24b commence only after some initial amount of translation of movable support member 14. It should be understood that additional fixed support members may be utilized to provide additional bending surfaces, serving to introduce additional microbending loss in the fiber; the additional losses may be made to commence at preselected points on the mechanical translation path of the movable member by selection of shape, dimension and position of each of the additional fixed support member. One such additional support member 26 is shown in broken line in FIG. 1b. Further, it should be understood that the additional support members, such as support member 26, may be made movable, as by an arrangement of a supporting post 28 movable in a slot 30, and that the movable additional support member may be mechanically loaded, as by a spring means 32 and the like, whereby the bending forces on the fiber loop (and therefore the input/output relationship of transducer 10 are linearly, or non-linearly, related to the loop dimensions and, therefore, to the mechanical translation of movable member 14.

Source means 20 and detector means 22 can be located adjacent to, or removed from, each other and can be positioned adjacent to, or remote from, the transducer mechanical mechanism on support member 11. The optical waveguide fiber is typically fabricated of electrically insulative material, providing essentially complete electrical isolation between source means 20, the transducer mechanical assembly on support member 11 and detector means 22.

The mechanical mechanism for causing movement of movable support member 14, may, as illustrated, mount support member 14 upon the periphery of a disc 32, rotatable about a pivot 36 responsive to motion of a member 38 attached to the opposite surface of disc 34 from the surface upon which member 14 is itself attached. Member 38 is so positioned as to move in an arcuate slot 40 cut through support member 11. Thus, when member 38 is positioned at one end of slot 40, e.g. the upper end (as seen in FIG. 1a) movable member 14 is at a position closest to fixed support member 12 and the loops of fiber 16 are relatively slack, providing a minimum of microbending loss and optical energy attenuation. As member 38 is moved, to rotate disk 34 about pivot 36 in the direction of arrow A, member 14, being situated at the edge of disk 34, is moved in an arcuate path to increasingly greater distance from fixed support member 12. The fiber loop is tightened and bent about members 12, 14 and 24; the microbending loss and optical energy attenuation are increased. If the disc is rotated through 180° (FIG. 1b) by movement of member 38 to the opposite end of slot 40, then movable member 14' is at a greatest possible distance from member 12 and maximum bending loss and optical attenuation occurs in fiber 16. Member 38' may then be rotated in the opposite direction, to rotate disc 34 in the direction of arrow B, decreasing the bending of the fiber loops and reducing microbending loss and optical energy attenuation. It will be seen that the particular movable support member may provide a continuous sensing of mechanical displacement, or may be utilized as a bi-level transducer (if a comparator is coupled to the output of detector means 22) whereby an optical "on-off" switching action is provided. Other mechanical mechanisms, such as the well-known over-center toggle mechanism and the like, may be utilized to position movable member 14 at only one of a plurality of mechanically stable positions, e.g. that position closest to member 12 (FIG. 1a) and that position furthest from member 12 (FIG. 1b).

Referring now to FIGS. 2a and 2b, an optical fiber transducer 42 for sensing the magnitude of a parameter, such as pressure, temperature, voltage, current and the like, utilizes an enclosure 43 having a pair of apertures 43a and 43b through which a length of optical fiber 44 is introduced into the enclosure. Within the enclosure, a pair of corrugated members 46 and 48 are arranged with the substantially complementary corrugations thereof facing one another. Members 46 and 48 are fabricated and arranged in such manner that the distance between the corrugations therefore change under the influence of the parameter to be sensed. Thus, members 46 and 48, the dimensions of which are shown in exaggerated fashion, may be formed of a piezoelectric material for voltage sensing, may be a hollow diaphragm-type member for pressure sensing, may be moved responsive to the magnetic field caused by a flow of electric current, or may, as illustrated, be of materials (such as Teflon ®, selected matals and the like) having a high linear coefficient of thermal expansion, for temperature sensing. Members 46 and 48 are so positioned that fiber 44 passes therethrough with a minimized amount of bending at a lowest sensed parameter value, when the corrugations are at their greatest separation or distance. With increasing magnitude of the sensed parameter, one or both of the members expand, in the direction of arrows T, whereby the expanded members 46' and 48' (FIG. 2b) narrower the gap between the corrugated surfaces thereof, and increase the bending of fiber 44. The increase in microbending losses will increase optical attenuation. The relationship between the magnitude of optical attenuation and the magnitude of the sensed parameter may be correlated over the entire sensed parameter range utilized.

In the temperature-sensing embodiment illustrated, a common optical means 50 provides optical energy responsive to the presence of an energizing potential $V_s$. A portion 50a of the optical energy therefrom is coupled into a first end 44a of the sensor fiber. The remaining fiber end 44b is coupled to a first optical detector means 52, receiving an amount of energy 52a from the fiber after attenuation thereof by passage through the transducer. A second optical fiber 54 also receives a portion 50b of the energy from common source means 50 for transmission directly to a second optical detector means 56, without passage through transducer 42. It will be seen that the magnitude of the output $V_X$ of first detector means 52, with respect to the magnitude of the potential $V_r$ output from the reference detector means 56, provides a quantitative measure of the amount by which first detector means incident energy portion 52a has been attenuated due to microbending losses caused by movement of corrugated members 46 and 48. Advantageously, as some amount of microbending losses will occur even at the lowest value of sensed parameter, the length of reference optical fiber 54 is made less than the length of sensor optical fiber 44, so that the magnitude of reference detector means output potential $V_r$ is always greater than the greatest magnitude of the transducer detector means 52 output potential $V_x$. A potentiometer 58 may then be connected across the reference detector means output, and the wiper arm thereof adjusted, as required, to provide a reference voltage $V_r'$ equal to the maximum transducer means output potential $V_X$ actually provided by a particular transducer. The sensed parameter magnitude may be suitably processed and displayed, in accordance with an empirically, or otherwise, derived curve relating the magnitude of transducer detector means output potential $V_X$ to the reference potential $V_R'$, which relation monotonically changes as increased sensed parameter magnitudes increase microbending losses and decrease the amount of optical energy incident upon detector means 52.

A bi-level-output transducer, for simple "on-off" thermostatic switching action, is illustrated. A comparator means 60 has a reference input 60a connected to the wiper arm of potentiometer 58 and a second input 60b connected to the transducer detector means 52 output potential $V_X$. The potentiometer wiper arm is adjusted such that the substantially constant reference voltage $V_R'$ at comparator input 60a is at a level at which switching of the comparator output 60c is desired to occur. For all sensed temperatures less than the threshold value set by reference potential $V_R'$, the transducer introduces insufficient microbending losses to attenuate the transducer detector means input energy 52a to a desired level (FIG. 2a). Therefore, detector means 52 output voltage $V_x$ provides a comparator input 60b voltage which is greater than the voltage at comparator input 60a, whereby a first, e.g. logic-high, level of comparator output voltage $V_o$ is provided. As the magnitude of the sensed parameter increases, the microbending losses also increase and the magnitude of transducer sensing output voltage $V_x$ decreases. At the desired sensed parameter magnitude (FIG. 2b), the expansion of members 46 and 48 have introduced enough microbending loss such that the optical energy received by sensing means 52 is so attenuated that the output potential $V_X'$ thereof has been reduced to equal the reference voltage $V_R'$, whereby comparator 60 switches the level at the output thereof; the comparator output voltage $V_o'$. Thus changes by a discernable amount, e.g. is now a logic-low level, and serves to actuate subsequent apparatus (not shown) to carry out actions necessary due to the sensed parameter reaching the predetermined threshold value.

It will be seen that in either of transducers 10 and 42, the associated source means 20 or 50 and the associated detecting means 22 or 52 and 56 are all electrically isolated from one another and from the transducer sensed-parameter mechanism.

While several presently preferred embodiments of my novel fiber optics sensed-parameter-magnitude transducers have been described in detail herein, many variations and modifications will now occur to those skilled in the art. It is my intent, therefore, to be limited only by the scope of the appending claims.

What is claimed is:

1. A transducer for providing an electrical signal of magnitude responsive to the magnitude of a parameter to be sensed, comprising:

a continuous first optical fiber having first and second ends;

a continuous second optical fiber having first and second ends;

single transmitter means for simultaneously introducing a quantity of optical energy directly into the first ends of each of said first and second fibers;

first and second detector means, each directly connected to the second end of only the associated one of said first and second fibers, for converting the magnitude of optical energy received at the respective first and second fiber second ends to the respective magnitudes of first and second electrical signals;

a pair of members having complementary corrugated portions, with a portion of said first optical fiber between said first and second ends thereof being arranged between the spaced corrugated portions of said members, said members being adapted to provide a change in the spacing distance between said complementary corrugated portions responsive to a change in the magnitude of the parameter to be sensed to vary the optical attenuation loss through only said first fiber due to microbending as the spacing distance between said corrugated portions changes to cause a variation in the first detector means output signal;

said second fiber being positioned away from said paid of members and having a substantially constant optical attenuation loss therethrough; and circuit means directly receiving an output of said first detector means and a fixed portion of the output of said second detector means for providing said transducer electrical signal magnitude directly responsive to the difference therebetween.

2. The transducer of claim 1, wherein the spacing distance decreases and the optical attenuation loss due to microbending increases with an increase in the sensed parameter magnitude.

3. The transducer of claim 2, wherein the sensed parameter is temperature, and at least one of said members is fabricated of a material having a selected coefficient of linear expansion.

4. The transducer of claim 1, further comprising an enclosure having surfaces for mounting said members with said first optical fiber between the complementary corrugated portions thereof.

5. The transducer of claim 1, wherein said circuit means compares the magnitude of the electrical signal from said first detector means and the fixed portion of the electrical signal magnitude from said second detector means to provide first and second transducer output conditions, respectively, when the first detector means electrical signal magnitude is respectively greater than and less than the magnitude of the fixed portion of said second detector means electrical signal magnitude.

6. The transducer of claim 1, wherein said second fiber has a length less than the length of said first fiber, to cause the magnitude of the second detector means output signal to always be greater than the magnitude of the first detector means output signal.

* * * * *